(12) United States Patent
Keenan

(10) Patent No.: US 8,487,881 B2
(45) Date of Patent: Jul. 16, 2013

(54) INTERACTIVE INPUT SYSTEM, CONTROLLER THEREFOR AND METHOD OF CONTROLLING AN APPLIANCE

(75) Inventor: Vaughn E. Keenan, Calgary (CA)

(73) Assignee: SMART Technologies ULC (CA)

( * ) Notice: Subject to any disclaimer, the term of this patent is extended or adjusted under 35 U.S.C. 154(b) by 919 days.

(21) Appl. No.: 11/873,576

(22) Filed: Oct. 17, 2007

(65) Prior Publication Data
US 2009/0102800 A1 Apr. 23, 2009

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| 5,594,469 A | 1/1997 | Freeman et al. | |
| 5,950,173 A * | 9/1999 | Perkowski | 705/26 |
| 5,982,352 A * | 11/1999 | Pryor | 345/156 |
| 6,208,330 B1 * | 3/2001 | Hasegawa et al. | 345/173 |
| 7,202,860 B2 * | 4/2007 | Ogawa | 345/175 |
| 2004/0246338 A1 * | 12/2004 | Lieberman et al. | 348/207.1 |
| 2005/0128184 A1 * | 6/2005 | McGreevy | 345/156 |
| 2005/0248539 A1 | 11/2005 | Morrison et al. | |
| 2005/0267676 A1 * | 12/2005 | Nezu et al. | 345/173 |
| 2006/0139314 A1 * | 6/2006 | Bell | 345/156 |
| 2006/0250380 A1 * | 11/2006 | Oliver | 345/179 |

FOREIGN PATENT DOCUMENTS

EP  1 517 228 A2  3/2005

OTHER PUBLICATIONS

Transmittal; International Search Report; and Written Opinion of the International Searching Authority for International Application PCT/CA2008/001826.

* cited by examiner

*Primary Examiner* — William Boddie
*Assistant Examiner* — Andrew Schnirel
(74) *Attorney, Agent, or Firm* — Katten Muchin Rosenman LLP (57) ABSTRACT

An interactive input system comprises a consumer electronic device and a controller for the consumer electronic device. The controller is operable in one of a touch input mode and a gesture input mode and controls the consumer electronic device in response to one of the detected user touch input and user gesture input depending on the operating mode of the controller.

16 Claims, 5 Drawing Sheets

INTERACTIVE INPUT SYSTEM, CONTROLLER THEREFOR AND METHOD OF CONTROLLING AN APPLIANCE

FIELD OF THE INVENTION

The present invention relates to an interactive input system, a controller therefor and to a method of controlling an appliance.

BACKGROUND OF THE INVENTION

Interactive input systems are well known in the art and are becoming increasingly popular. These interactive systems are common in both kiosk and electronic writeboard applications. Such interactive input systems typically include a touch screen having a touch surface on which contacts are made using a pointer in order to generate user input. Pointer contacts with the touch surface are detected and are used to generate corresponding output depending on areas of the touch surface where the pointer contacts are made. Common touch systems utilize analog resistive, electromagnetic, capacitive, acoustic, beam interruption or machine vision techniques to identify pointer contacts on the touch surface.

For example, U.S. Pat. Nos. 6,803,906; 6,954,197; and 7,236,162 to Morrison et al. and International PCT Application No. WO 02/03316, all assigned to SMART Technologies Inc. of Calgary, Alberta, assignee of the subject application, disclose a camera-based touch system comprising a touch screen that includes a touch surface on which a computer-generated image is presented. A rectangular bezel or frame surrounds the touch surface and supports digital cameras at its corners. The digital cameras have overlapping fields of view that encompass and look generally across the plane of the touch surface. The digital cameras acquire images looking across the touch surface from different viewpoints and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y)-co-ordinates relative to the touch surface using triangulation. The pointer co-ordinate data is conveyed to a computer executing one or more application programs. The computer uses the pointer co-ordinate data to update the computer-generated image that is presented on the touch surface. Pointer contacts on the touch surface can therefore be recorded as writing or drawing or used to control execution of application programs executed by the computer.

Another example of a touch system is disclosed in U.S. patent application Ser. No. 10/838,536 to Morrison et al. filed on May 5, 2004 and assigned to SMART Technologies Inc. This touch system includes a touch screen having a touch surface on which pointer contacts are to be made. The touch screen is a flat panel display such as for example, a plasma display, a high-definition television (HDTV), a liquid crystal display (LCD) or the like that presents an image on the touch surface. A bezel surrounds the touch surface. A pair of imaging assemblies is positioned adjacent the top corners of the touch screen 52. The imaging assemblies communicate with each other as well as with a computer 60 executing one or more application programs. The imaging assemblies are positioned so that they see the touch surface in three-dimensions as a perspective view and are calibrated to establish the relationship between (X,Y,Z) points in their perspective views and (x,y) points in acquired images. The computer processes pointer co-ordinate data generated by the imaging assemblies to determine the locations of pointer contacts made on the touch surface using triangulation and updates the image that is presented on the touch surface in response to the pointer contacts. Pointer contacts on the touch surface can therefore be recorded as writing or drawing or used to control execution of application programs executed by the computer.

Although interactive input systems such as those discussed above have been successful in commercial and business environments, interactive input systems are not commonly used in residential environments. As is known, most common consumer electronic devices are provided with remote control units that allow users to control the consumer electronic devices at a distance. Unfortunately, many problems are associated with remote control units. If the residence includes many consumer electronic devices there are typically an equal number of remote control units. As a result, when trying to operate a consumer electronic device, the user must often hunt through an assortment of remote control devices to find the right one. Universal remote control units to control a host of consumer electronic devices are available. These universal remote control units however, often require complex programming and are prone to program loss requiring time consuming reprogramming. Also, remote control units are prone to damage or loss.

Providing consumer electronic devices with touch input facilities has been considered. Such touch input facilities however, require users to be within arms reach of the consumer electronic devices. Most users have become accustomed to interacting with consumer electronic devices at a distance. As will be appreciated, there exists a need to improve the manner by which users interact with consumer electronic devices.

It is therefore an object to provide a novel interactive input system, a controller therefor and to a method of controlling an appliance.

SUMMARY OF THE INVENTION

According to one aspect there is provided an interactive input system comprising:
an appliance;
imaging structure; and
processing structure communicating with said appliance and said imaging structure, said processing structure processing image data received from said imaging structure to detect user touch input and user gesture input and outputting commands to said appliance corresponding to the detected user input.

In one embodiment, the imaging structure captures images of a touch surface and images of a region remote from the touch surface. The processing structure processes the images of the touch surface to detect user touch input and processes the images of the region to detect user gesture input. The processing structure is operable in one of a touch input mode and a gesture input mode. In the touch input mode, the processing structure only processes the images of the touch surface and in the gesture input mode, the processing structure only processes the images of the region. The processing structure is automatically conditioned to the touch input mode when the existence of a pointer is detected in the captured images of the touch surface.

The imaging structure may comprise at least two first cameras looking generally across the touch surface from different viewpoints and having overlapping fields of view and at least one second camera looking into the region. The first and second cameras may be mounted on a housing adjacent the touch surface. In one embodiment, the touch surface forms part of a display panel. The display panel may form part of the appliance or may be separate from the appliance.

According to another aspect there is provided an interactive input system comprising:

a consumer electronic device; and a controller for said consumer electronic device, said controller being operable in one of a touch input mode and a gesture input mode and controlling said consumer electronic device in response to one of detected user touch input and user gesture input depending on the operating mode of said controller.

In one embodiment, the controller separately images an area in close proximity to a touch surface and a region beyond the area. The controller remains in the gesture input mode until a pointer appears in images of the area at which time the controller is automatically conditioned to the touch input mode.

According to yet another aspect there is provided a method of controlling operation of an appliance comprising:

monitoring a touch surface to detect user touch input and capturing images of a region beyond the touch surface to detect user gesture input; and in response to detected user touch or user gesture input, issuing at least one command to control said appliance.

The interactive input system provides advantages in that, in the gesture input mode, closed loop feedback is provided to the user thereby facilitating user gesture input. In the touch input mode, an efficient and simple interface is provided that enables quick and easy manipulation of data sets and the control of complex sequences.

BRIEF DESCRIPTION OF THE DRAWINGS

Embodiments will now be described more fully with reference to the accompanying drawings in which.

DETAILED DESCRIPTION OF THE EMBODIMENTS

Figure 1:
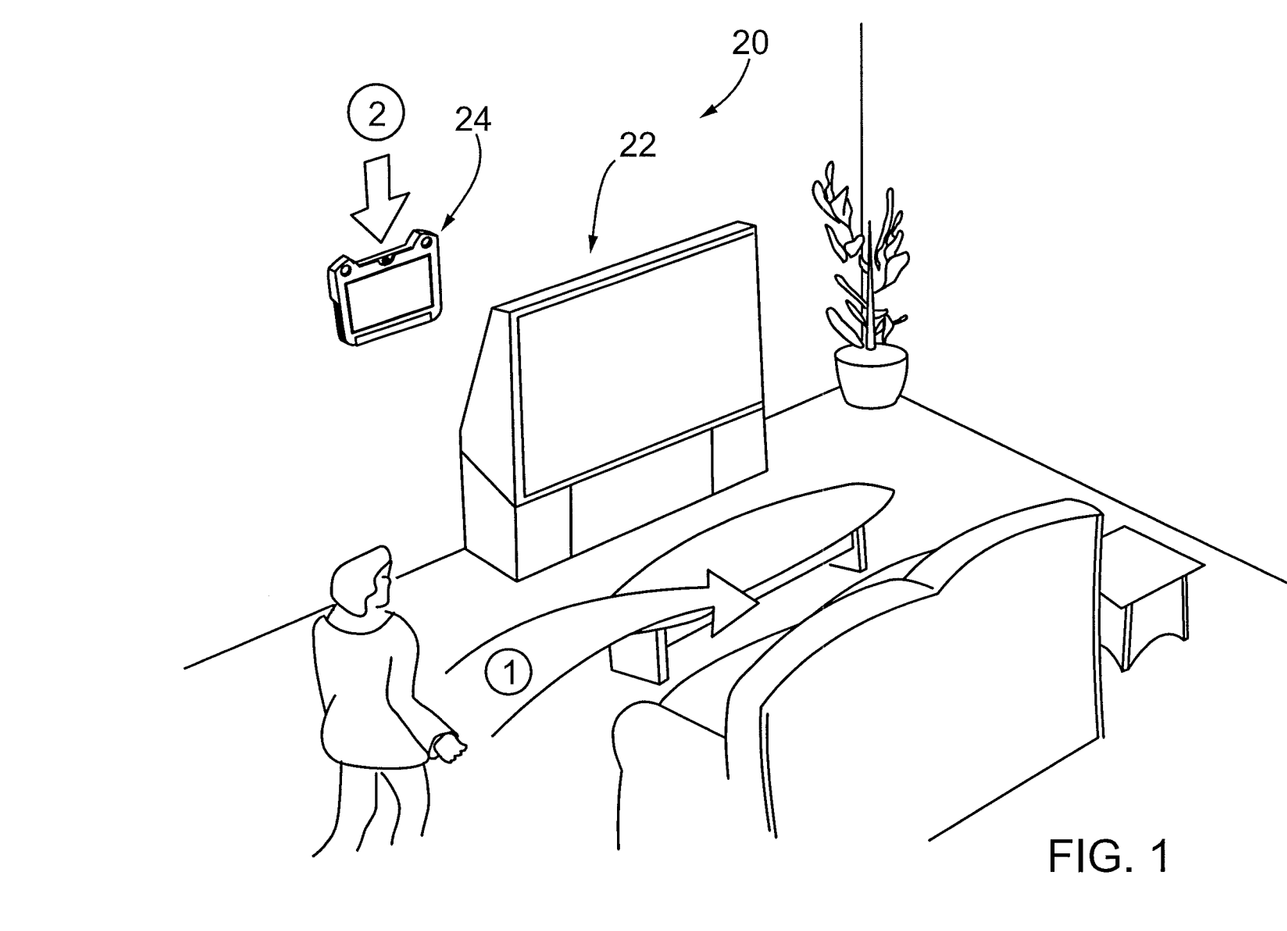
FIG. 1 is a perspective view of an interactive input system including a main display unit and a control unit.
Figure 2:
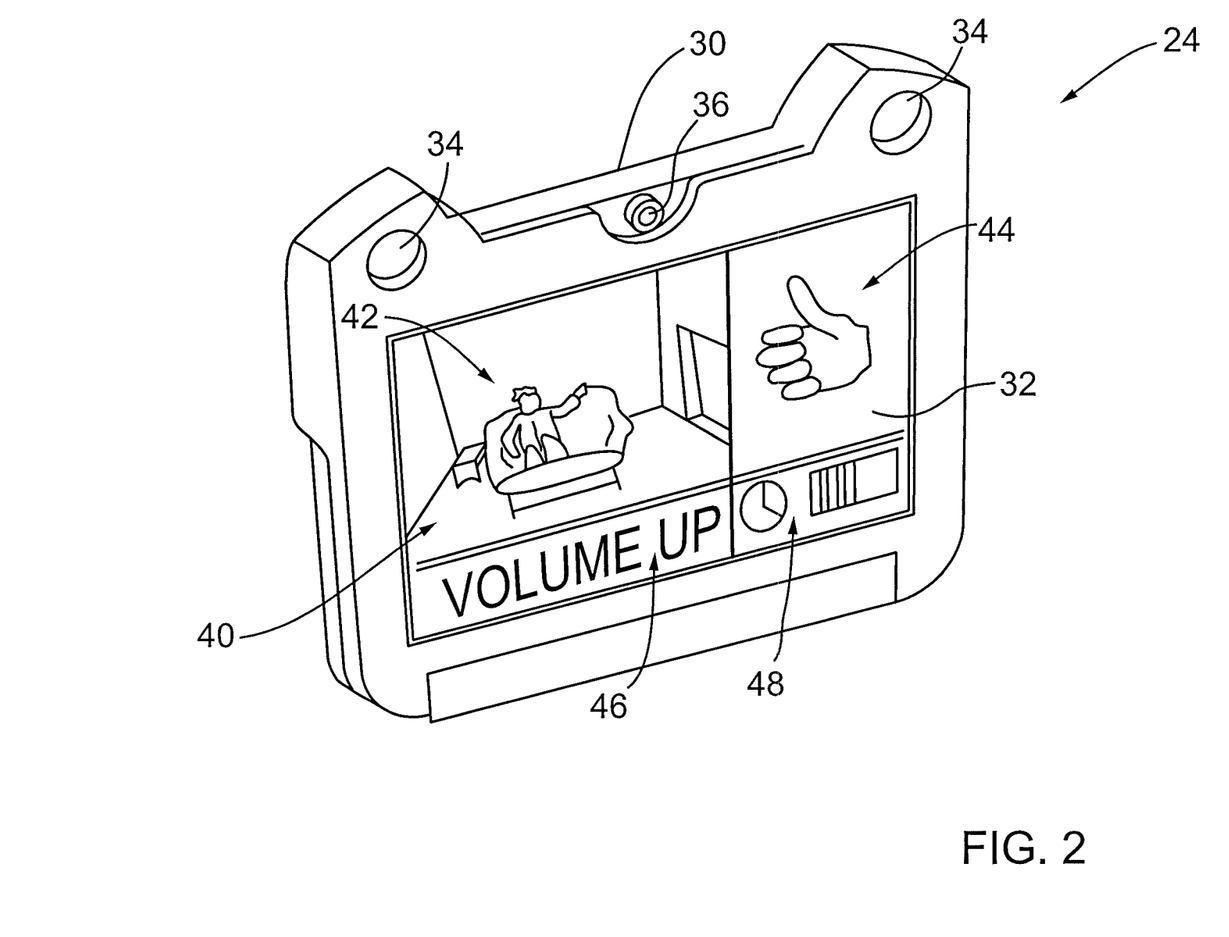
FIG. 2 is a front plan view of the control unit of FIG. 1 in a gesture input mode.
Figure 3:
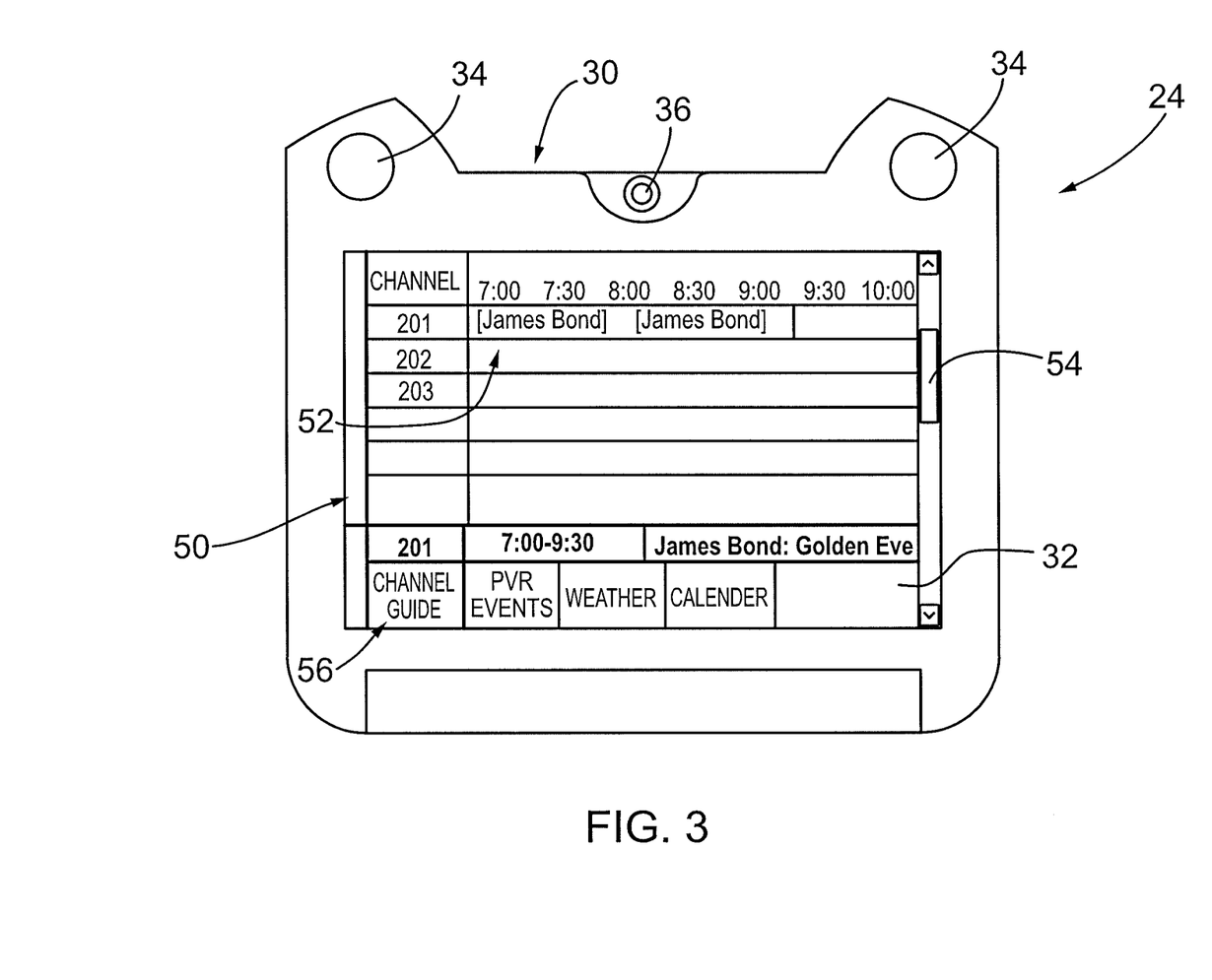
FIG. 3 is a front plan view of the control unit of FIG. 1 in a touch input mode.

Turning now to FIG. 1, an interactive input system is shown and is generally identified by reference numeral 20. Interactive input system 20 includes a main display unit 22 and a separate control unit 24. In this embodiment, the main display unit 22 is a large, flat panel display such as for example, a plasma display, a high-definition television (HDTV), a liquid crystal display (LCD) or the like. The control unit 24 is a small flat panel display such as an LCD or the like and is mounted on a wall to one side of the main display unit 22. The control unit 24 and main display unit 22 communicate over a communications link. The communications link may be a physical link such as for example a USB or other suitable wired connection or may be a radio frequency (RF), infrared (IR) or other suitable wireless link. The control unit 24 controls the main display unit 22 in response to both remote user gesture input and proximate user touch input as will be described.

FIGS. 2 to 5 better illustrate the control unit 24. As can be best seen in FIGS. 2 and 3, the control unit 24 includes a housing 30 surrounding an LCD display panel 32. A pair of digital camera assemblies 34 is mounted on the housing 30. In this embodiment, each digital camera assembly 34 is positioned adjacent a different top corner of the housing 30. The digital camera assemblies 34 are of the type disclosed in aforementioned U.S. patent application Ser. No. 10/835,536 filed on May 5, 2004 to Morrisson et al. and assigned to SMART Technologies Inc., assignee of the subject application, the content of which is incorporated herein by reference. Each digital camera assembly 34 in this embodiment comprises a CMOS digital camera having an on-board digital signal processor (DSP) and static random access memory (SRAM). The fields of view of the digital camera assemblies 34 look down and across the display panel 32 and thus, both digital camera assemblies 34 see the entire display panel. The fields of view of the digital camera assemblies 34 also overlap in a region in front of the display panel 32. In this embodiment, the region encompasses an area that extends about two (2) feet in front of the display panel 32. The digital camera assemblies 34 are positioned so that they see the display panel 32 in three-dimensions as a perspective view and are calibrated to establish the relationship between (X,Y,Z) points in their perspective views and (x,y) points in acquired images. The digital camera assemblies 34 are used to detect user touch input proximate to the control unit 24 as will be described.

Figure 4:
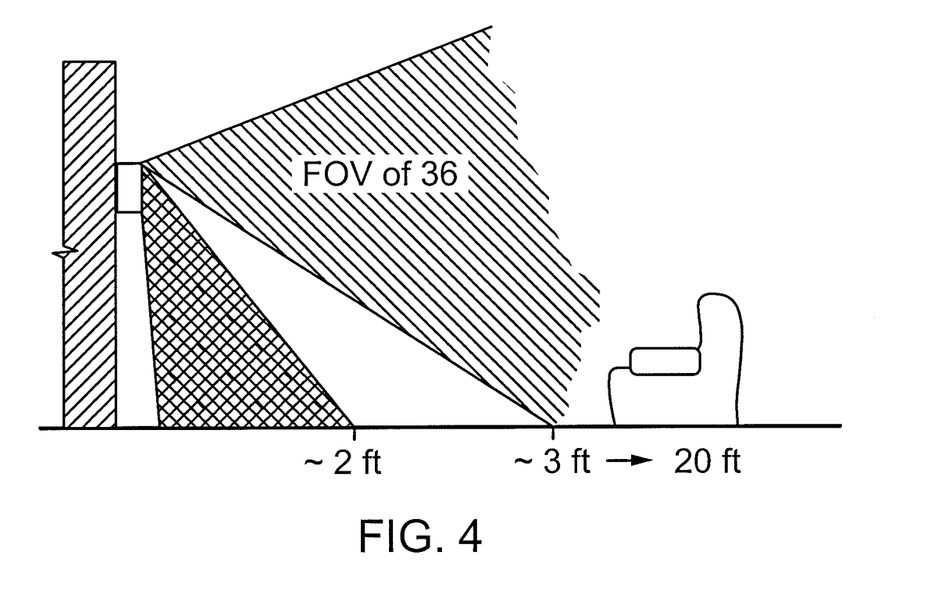
FIG. 4 is a side view showing the fields of view of cameras of the control unit of FIGS. 2 and 3.

A forward looking digital camera 36 is centrally mounted on the housing 30 between the digital camera assemblies 34. The digital camera 36 has a wide field of view that extends from about two (2) feet to about twenty (20) feet in front of the control unit 24. The digital camera 36 is used to detect user gesture input remote from the control unit 24 as will be described. FIG. 4 shows the fields of view (FOV) of the digital camera assemblies 34 and the digital camera 36.

Figure 5:
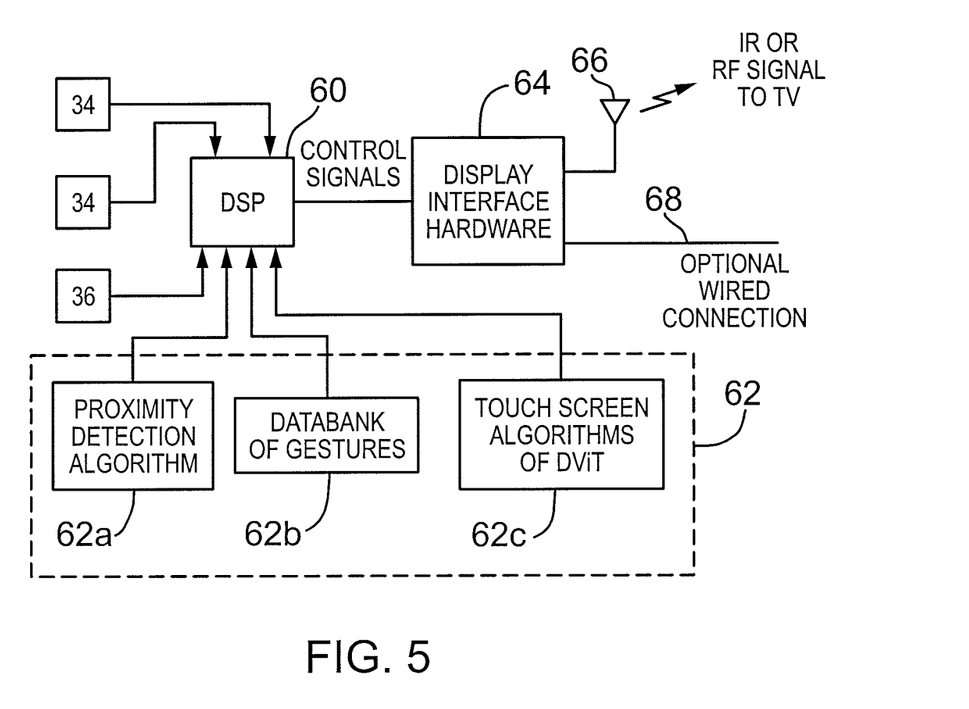
FIG. 5 is a schematic block diagram of the control unit of FIGS. 2 and 3.

Turning now to FIG. 5, a schematic block diagram of the control unit 24 is shown. As can be seen, the control unit 24 comprises a digital signal processor (DSP) 60 that communicates with the digital camera assemblies 34 and the digital camera 36. DSP 60 also communicates with memory 62 and a display unit interface 64. The display unit interface 64 comprises an antenna 66 enabling wireless communications with the main display unit 22 and a jack 68 enabling wired communications with the main display unit 22. The memory 62 stores the DSP operating system, a proximity detection application 62a, a databank of gestures 62b (i.e. a gesture set) and one or more touch input applications 62c. In this embodiment, the gesture set comprises at least volume up, volume down, mute, channel up and channel down gestures. Those of skill in the art will however appreciate that the gesture set may comprise additional or alternative gestures.

During operation of the interactive input system 20, the DSP 60 executes the proximity detection application as a background process to detect when a pointer such as a finger, pen tool or other object is brought into proximity of control unit 24 and into the fields of view of the digital camera assemblies 34. As the proximity detection application is executed, the output of the digital camera assemblies 34 is monitored. When the output of the digital camera assemblies 34 signifies the existence of a pointer, the DSP 60 automatically conditions the control unit 24 to the touch input mode.

In the touch input mode, the image output of the digital camera 36 is ignored and the image output of the digital camera assemblies 34 is processed. When a pointer does not exist in the image output of the digital camera assemblies 34, the DSP 60 automatically conditions the control unit 24 to the gesture input mode. In the gesture input mode, the image output of the digital camera assemblies 34 is ignored and the image output of the digital camera 36 is processed.

When the DSP 60 has been automatically conditioned to the gesture input mode, the control unit 24 processes images acquired by the digital camera 36 to detect and interpret gestures input by the user. In particular, images acquired by the digital camera 36 are processed by the DSP 60 to detect the orientation and/or movement of a user's hand. The detected hand orientation and/or movement is then compared with the gesture set in the databank 62b to recognize the input gesture. Upon recognition of the input gesture, an associated command(s) is(are) determined by the DSP 60 and output to the main display unit 22. Recognition of input gestures may be carried out in a manner similar to that described in the publication entitled "Consumer Electronics Control System Based On Hand Gesture Movement Invariants" authored by Premaratne et al. (IET Comput. Vis., 2007, Vol. 1 (1), pp. 35 to 41), the content of which is incorporated herein by reference. Thus, remote user gestures are detected and processed and converted into commands that are used to control the main display unit 22. An image 40 suitable to assist the user in providing gesture input is presented on the display panel 32. The image 40 presented on the display panel 32 also provides visual feedback to the user confirming gesture recognition and confirming the command that is provided to the main display unit 22 in response to gesture recognition. For example, in FIG. 2, the display panel 32 shows the image 42 acquired by the digital camera 36, the recognized gesture 44, the command 46 that is provided to the main display unit 22 and the current state 48 of the main display unit function to which the command is directed.

If the user is in close proximity to the control unit 24 and a pointer is captured in the images acquired by the digital camera assemblies 34 resulting in the control unit 24 being automatically conditioned to the touch input mode, the control unit 24 operates as a touch sensitive panel in a manner similar to that disclosed in aforementioned incorporated U.S. patent application Ser. No. 10/838,536. In particular, when a pointer is brought into the fields of view of the digital camera assemblies 34 and contacts the display panel 32, the images acquired by the digital camera assemblies 34 include the pointer. The DSP of each digital camera assembly 34 moves the acquired image data to the SRAM and then compares the image data with a mathematical model describing the boundary of the display panel 32 as seen by the digital camera assembly 34. This enables a pixel subset of the captured image including only relevant pixels to be processed. The DSP of each digital camera assembly 34 in turn processes the pixel subset to determine the (x,y) position of the pointer within the captured image. The digital camera assemblies 34 in turn convey this pointer co-ordinate data to the DSP 60, which uses the pointer co-ordinate data to calculate the (X,Y,Z) location of the pointer contact on the surface of the display panel 32 using triangulation. The pointer location data is then recorded by the DSP 60 and thus, physical user contacts with the display panel 32 are detected, processed and converted into commands that are used to control the main display unit 22. In this mode, an image 50 suitable for user touch input is presented on the display panel 32 allowing the user to interact easily with the display panel. For example, in FIG. 3, the display panel 32 presents a program guide listing 52, a scroll bar 54 to enable the user to scroll through the program guide listing and a larger view 56 of the highlighted program guide in the program guide listing.

As will be appreciated, in the gesture input mode, the control unit 24 provides closed loop feedback to the user thereby facilitating gesture input control. In this embodiment, as the control unit 24 is separate from the main display unit 22, the gesture input and touch input visual feedback provided to the user via the display panel 32 does not detract or impair the quality of the image presented on the main display unit 22. In the touch input mode, the control unit 24 provides an efficient and user friendly interface to interact with and program the main display unit 22.

Figure 6:
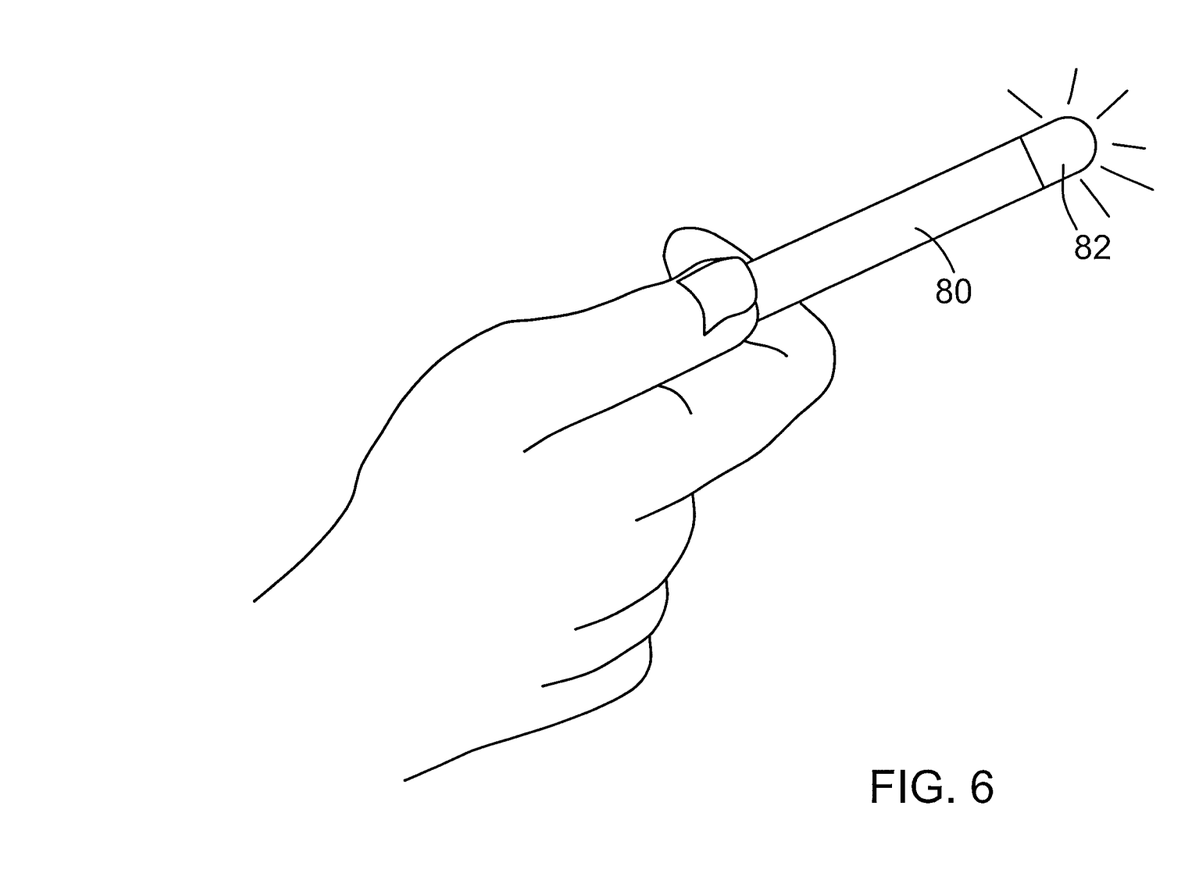
FIG. 6 shows a wand grasped by a user's hand that is used to facilitate user gesture input.

To assist in gesture recognition, a tool may be used to facilitate image processing. For example, a wand 80 having a tip portion 82 that emits a diffused, omni-directional infrared (IR) glow when grasped by a user as shown in FIG. 6 may be used to input gestures. With the wand 80 grasped and glowing, wrist and thumb gestures are used to provide gesture input that can be used to control the main display unit 22. For example, a clockwise spinning gesture may be used to increase the main display unit volume, advance channel selection or forward navigate through a command selection list. Similarly, a counter-clockwise spinning gesture may be used to decrease the main display unit volume, decrement channel selection or backward navigate through a command selection list. Of course, alternative gestures may be used to perform similar functions.

If desired, when the main display unit 22 is not in use, the control unit 24 can be used to display other information such as for example the time and/or date, weather information, news and/or sports information, stock information, message board notes, a list of recorded programs or a list of programs to be recorded.

In the above embodiment, the control unit 24 is used to control a main display unit 22. Those of skill in the art will however appreciate that the control unit 24 may be used to control other consumer electronic devices (i.e. appliances) allowing a user to control virtually any consumer electronic device remotely via remote user gesture input and proximate user touch input.

The digital camera assemblies 34 and digital camera 36 and the functionality of the control unit 24 may be incorporated into the appliance. In the case of the main display unit, the digital camera assemblies 34 and digital camera 36 are housed within the bezel of the main display unit that surrounds the main display unit screen. Processing of image data output by the digital camera assemblies 34 and the digital camera 36 is carried out in the same manner described above by the processing electronics of the main display unit. In this case, visual feedback is provided to the user via images overlaying the display output of the main display unit or via split screen or picture-in-picture images.

Although the control unit 24 is shown as comprising a pair of digital camera assemblies 34 adjacent the top corners of the housing 30, each digital camera assembly of which looks down and across the entire display panel 32, those of skill in the art will appreciate that alternatives are available. Digital camera assemblies 34 may be positioned at different positions on the housing. Also, the fields of view of the digital camera assemblies may overlap only over a portion of the display panel to create an active touch region that does not extend over the entire display panel surface. Further, a single digital camera assembly 34 in conjunction with one or more reflective surfaces bordering the display panel 32 may be used to detect touch input. In addition, rather than using a single digital camera 36 to capture images that are processed to detect gesture input, a pair of stereoscopic cameras may be used. Furthermore, moveable mirror devices such as for example, digital micrometer devices (DMDs) or moveable prisms may be used to alter the fields of view of the digital camera assemblies 34 when the control unit is in the gesture input mode to detect remote input gestures thereby to obviate the need for the digital camera(s) 36.

Rather than using vision technology to detect user touch input, analog resistive, electromagnetic, capacitive, acoustic or beam interruption technology may be used in place of the digital camera assemblies.

In environments where a separate control unit is employed, the control unit 24 need not be mounted on a wall adjacent the main display unit 22. The control unit 24 may be positioned at other convenient locations. For example, the control unit 24 may be incorporated into furniture such as a coffee table, other table top etc.

Although embodiments have been described with reference to the drawings, those of skill in the art will appreciate that variations and modifications may be made without departing from the spirit and scope thereof as defined by the appended claims.

What is claimed is:

1. An interactive input system comprising:
an appliance;
imaging structure separately imaging an area in close proximity to a touch surface and a region remote from said touch surface;
memory storing a databank of gestures; and
processing structure communicating with said appliance, said memory and said imaging structure, said processing structure being operable in one of a touch input mode and a gesture input mode, in said touch input mode, said processing structure controlling operation of said appliance in response to user touch input entered via user interaction with a touch surface and in said gesture input mode, said processing structure controlling operation of said appliance in response to remote user gesture input occurring anywhere in said region remote from said touch surface that is within the field of view of said imaging structure, wherein said controller remains in said gesture input mode until a pointer appears in images of said area at which time said controller is automatically conditioned to said touch input mode and wherein in said gesture input mode and during detection of remote user gesture input, said processing structure compares received image data with said databank of gestures to recognize input gestures.

2. The interactive input system according to claim 1 wherein in said touch input mode, said processing structure only processing the images of said area in close proximity to said touch surface and in said gesture input mode, said processing structure only processing the images of said remote region.

3. The interactive input system according to claim 2 wherein said imaging structure comprises at least two first cameras looking generally across said touch surface from different viewpoints and having overlapping fields of view and at least one second camera looking into said remote region.

4. The interactive input system according to claim 3 wherein said first and second cameras are mounted on a housing adjacent said touch surface.

5. The interactive input system according to claim 4 wherein said touch surface forms part of a display panel.

6. The interactive input system according to claim 4 wherein the remote region extends from about two feet to twenty feet in front of said touch surface.

7. The interactive input system according to claim 5 wherein said display panel provides visual feedback concerning detected user touch input and remote user gesture input.

8. An interactive input system comprising:
a consumer electronic device; and
a controller for said consumer electronic device, said controller being operable in one of a touch input mode and a gesture input mode and controlling said consumer electronic device in response to one of detected user touch input entered via user interaction with a touch surface and remote user gesture input occurring anywhere in a region remote from said touch surface depending on the operating mode of said controller, wherein said controller separately images an area in close proximity to the touch surface and the region beyond said area, said controller remaining in said gesture input mode until a pointer appears in images of said area at which time said controller is automatically conditioned to said touch input mode and wherein in said gesture input mode, said controller compares image data with a databank of gestures stored in memory to recognize remote user gesture input.

9. The interactive input system according to claim 8 wherein said controller comprises at least two spaced, first imaging devices having overlapping fields of view looking generally across said touch surface and processing structure processing acquired image data to detect pointer contacts on said touch surface.

10. The interactive input system according to claim 9 wherein said controller further comprises at least one second imaging device looking into said region.

11. The interactive input system according to claim 8 wherein said controller comprises a display panel, said display panel providing visual feedback concerning detected user touch and remote user gesture input.

12. The interactive input system according to claim 11 wherein said display panel defines a touch surface on which user touch input is made.

13. An interactive input system comprising:
a household consumer appliance; and
a control unit separate from said household consumer appliance, said control unit comprising a housing configured for mounting on a wall surface, a display screen on said housing, imaging structure on said housing looking generally across said display screen and forwardly of said display screen into a region remote from said control unit, and processing structure within said housing communicating with said household consumer appliance and said imaging structure, said processing structure being operable in one of a touch input mode and a gesture input mode and controlling said consumer appliance in response to one of detected user touch input made via user interaction with said display screen and remote user gesture input made anywhere in said remote region depending on the operating mode of said processing structure, wherein said imaging structure separately images an area in close proximity to the touch surface and the remote region, said processing structure remaining in said gesture input mode until a pointer appears in images of said area at which time said processing structure is automatically conditioned to said touch input mode and wherein in said gesture input mode, said processing structure compares image data with a databank of gestures stored in memory to recognize remote user gesture input.

14. The interactive input system according to claim 13 wherein said imaging structure comprises at least two first cameras looking generally across said display screen from different viewpoints and having overlapping fields of view and at least one second camera looking into said remote region.

15. The interactive input system according to claim 14 wherein the remote region extends from about two feet to twenty feet in front of said control unit.

16. The interactive input system according to claim 14 wherein said display screen provides visual feedback concerning detected user touch and remote user gesture input.

* * * * *